Nov. 3, 1925.
R. C. HAWKINS ET AL
1,560,176
TRACTOR FRAME SPRING SUPPORT
Filed March 10, 1923
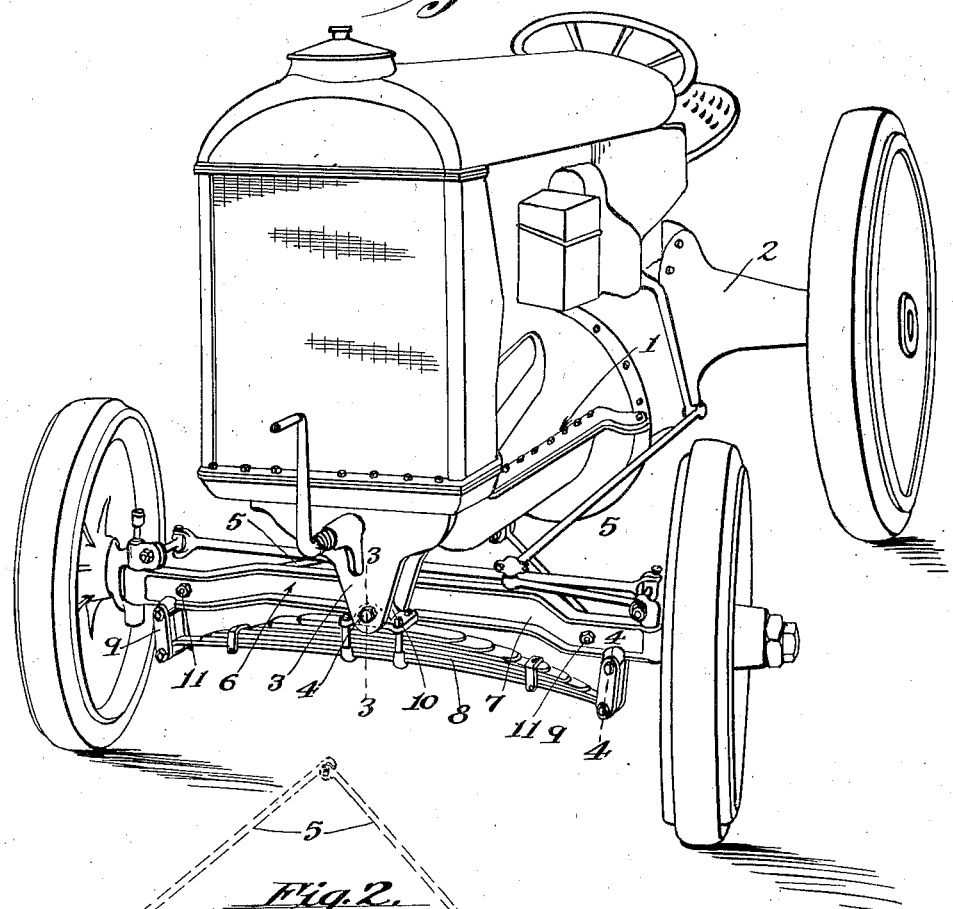
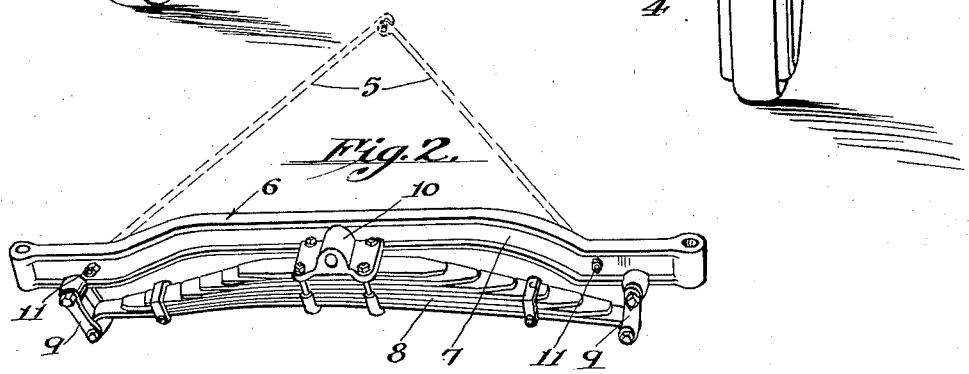
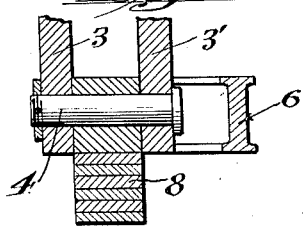
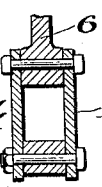
Inventors
R. C. Hawkins.
E. S. Hixson.
By Hazard and Miller
Attorneys.

Patented Nov. 3, 1925.

1,560,176

UNITED STATES PATENT OFFICE.

ROE C. HAWKINS AND ERNEST S. HIXSON, OF LONG BEACH, CALIFORNIA.

TRACTOR FRAME SPRING SUPPORT.

Application filed March 10, 1923. Serial No. 624,086.

*To all whom it may concern:*

Be it known that we, ROE C. HAWKINS and ERNEST S. HIXSON, citizens of the United States, residing at Long Beach, in the county of Los Angeles and State of California, have invented new and useful Improvements in Tractor Frame Spring Supports, of which the following is a specification.

Although our present invention may be referred to as a tractor frame spring support, it is a broad object of our invention to associate with the frame or body of a tractor or equivalent machine suitable flexible and inflexible supporting elements respectively connected therewith, our invention being especially applicable to a machine whose rear axle may have only a rotative motion within or relatively to a main frame or body.

It being understood that tractors of the type to which our invention is especially applicable commonly have their rear axles to pass directly through the body or frame thereof, with the result that every jolting or tilting motion imparted to said axle by irregularities in the ground traversed is transmitted to and participated in by said body or frame, it will be obvious that, when the forward end of such a tractor is also left unprovided with springs, the entire machine, and the driver riding thereon, may be subjected to a severe and continual racking or vibration; and it is an object of our present invention to diminish or obviate this racking or vibration.

It is an object of our invention to provide a three-point suspension for a tractor body, our preferred construction being such as to provide a resilient support at the front end of the tractor body, and such as to permit the use of radius rods flexibly connected with the body or frame of the tractor concurrently with a spring which may be underslung relatively to an axle to which the said radius rods extend.

It is a further object of our invention to provide a construction comprising an offset axle and an underslung spring so correlated and connected as to permit the front support of a vehicle to move vertically in the plane of the axis of said axle and through the horizontal plane thereof, and also to permit a lateral inclination of the body of said vehicle relatively to said axle, our preferred construction comprising a horizontal pivot pin extending longitudinally of said body and free to move in the vertical plane of said axis.

Further objects of our invention will appear from the following description of a preferred embodiment thereof and the claim appended hereto, taken in connection with the accompanying drawings, in which Figure 1 is a perspective view of a tractor provided with supporting means of our preferred design.

Fig. 2 is a similar view, showing only an offset axle and underslung spring and parts by which the same may be connected with the vehicle body.

Fig. 3 is a vertical section on line 3—3 of Figure 1.

Fig. 4 is an approximately vertical section on line 4—4 of Figure 1.

Referring in detail to the parts of the specific form of our invention shown in the drawing, 1 is the body or frame of a tractor or equivalent vehicle, and 2 is a housing having a rear axle adapted to rotate therein. Bearing plates for the forward end of the vehicle are shown at 3, 3', and 4 is a bearing pin extending through the mentioned bearing plates, the inextensible radius rods 5 being shown as pivotally connected to the undersurface of the tractor frame or body 1.

Referring now to the strictly novel features of our device, it will be understood that we do not pivot the mentioned bearing plates 3 by means of the pin 4 directly upon the axle 6, but in order to provide a resilient support at the front end of our tractor, we provide the axle 6 with an offset 7; and we also secure a resilient member such as the leaf spring 8, by means such as the shackles 9 in an underslung position relatively to the mentioned axle 6, our preferred construction being such that the bearing block 10, arranged centrally on the spring 8, shall remain substantially in the vertical plane of the axle 6, although capable of freely vibrating in this plane, and through the horizontal plane of the said axis.

From the foregoing description it will be obvious that the weight of the forward end of a tractor provided with our invention is resiliently supported by the spring 8 substantially in the vertical plane of the axis of the axle 6; and in order to retain the parts in substantially the relative positions referred to, and in order to prevent the axle 6 from turning relatively to the longitudinal axis of the tractor, as it might otherwise tend to do when one of the front wheels encounters an obstacle, we find it advantageous to employ also the mentioned radius rods 5, pivoted to the bottom of the tractor body and extending through the axle 6, the ends of these rods being shown as secured by the nuts 11. It will be understood that although radius rods have heretofore been employed to secure the front axle to the body of a motor vehicle which has been pivoted directly thereto, our invention, in its preferred embodiment, involves a departure from the practice referred to in that the radius rods are employed to connect a front axle with the body of a tractor which is resiliently supported from said axle.

It will be noted that, by the construction above described, we have provided a resilient connection between the forward end of the tractor and the front running gear thereof, the parts being so related that the weight of the tractor body has no tendency to twist or otherwise distort the front axle, the load being directly above the axis thereof, and the relationship of the radius rods by which the mentioned axle is connected with the body of our tractor being such that, when the body of the tractor rises or falls relatively to the mentioned axle, the latter may be turned slightly upon its axis and only a very slight torque need be taken by the spring 8.

The organization above described is rugged, simple and effective and capable of being built and installed at a cost which is trifling in comparison with the advantages attained thereby in prolonging the life of the machine and contributing to the comfort of the driver.

Our construction is moreover such as to keep the center of gravity of the entire organization as near to the ground as possible.

Thus we have produced a tractor frame spring support comprising a front axle having straight short end portions and having the remaining intermediate portion offset horizontally backwardly, spring shackles secured to the straight end portions and extending downwardly, a spring connected to the shackles and extending upwardly in front of the offset portion of the axle, a bearing block secured to the center of the spring and projecting upwardly, a pin operating longitudinally and horizontally through the bearing block, bearing plates upon the ends of the pin upon opposite sides of the bearing block, and a tractor frame connected to the bearing plates, said bearing block being in a line with the straight ends of the axle.

Although we have herein described but one embodiment, it will be understood that various features thereof might be independently employed, and also that various modifications might be made therein without departure from the spirit and scope of our invention as the same is indicated above and in the following claim.

What is claimed is:

A tractor frame spring support comprising in combination a front axle having a vertical web, flanges on said web, swiveling shackles comprising bolts extending through the axle and having swivel links with a bolt in the lower end of the links, said shackles being suspended from the axle adjacent the ends thereof, an offset section of the axle rearwardly in the center portion and on the same horizontal level with the ends, a leaf spring having its ends secured to the bottom bolts of the shackles, a bearing block attached to the top of the spring at its central position, a pin extending horizontally in front to rear direction through the bearing block, said pin being on substantially the level of the axle, and a pair of bearing plates attached to a tractor forming part of a tractor frame extending downwardly on both sides of the bearing block and secured to the pin therethrough, said bearing block being in a straight line with the ends of the axles.

In testimony whereof we have signed our names to this specification.

ROE C. HAWKINS.
ERNEST S. HIXSON.